United States Patent [19]
Mülleder et al.

[11] Patent Number: 5,788,939
[45] Date of Patent: Aug. 4, 1998

[54] PROCESS FOR THE PRODUCTION OF A CELLULOSE MOULDED BODY

[75] Inventors: Eduard Mülleder, Linz; Christoph Schrempf, Bad Schallerbach; Gabriele Schild, Vöcklabruck, all of Austria

[73] Assignee: Lenzing Aktiengesellschaft, Lenzing, Austria

[21] Appl. No.: 836,660

[22] PCT Filed: Sep. 19, 1996

[86] PCT No.: PCT/AT96/00167

§ 371 Date: May 2, 1997

§ 102(e) Date: May 2, 1997

[87] PCT Pub. No.: WO97/11213

PCT Pub. Date: Mar. 27, 1997

[30] Foreign Application Priority Data

Sep. 19, 1995 [AT] Austria ................................. 1557/95

[51] Int. Cl.⁶ ............................... B29B 13/08; D01F 2/02
[52] U.S. Cl. .................... 264/470; 264/101; 264/187; 264/485
[58] Field of Search ............................ 264/101, 187, 264/470, 485

[56] References Cited

U.S. PATENT DOCUMENTS

| | | |
|---|---|---|
| 2,179,181 | 11/1939 | Graenacher et al. |
| 3,447,939 | 6/1969 | Johnson |
| 3,447,956 | 6/1969 | Johnson |
| 3,508,941 | 4/1970 | Johnson |
| 3,870,609 | 3/1975 | Schirmer .............. 264/470 X |
| 4,486,585 | 12/1984 | Turunen et al. |
| 4,530,999 | 7/1985 | Selin et al. |
| 4,851,522 | 7/1989 | Chanzy et al. |
| 5,094,690 | 3/1992 | Zikeli et al. |
| 5,330,567 | 7/1994 | Zikeli et al. |

FOREIGN PATENT DOCUMENTS

| | | |
|---|---|---|
| 356419 | 2/1990 | European Pat. Off. |
| 2941624 | 5/1980 | Germany |
| 218769 | 2/1985 | Germany |
| 3439714 | 5/1985 | Germany |
| 47-29078 | 7/1972 | Japan ............................... 264/485 |
| WO83/02278 | 7/1983 | WIPO |

OTHER PUBLICATIONS

Abstract of E.P.O. 356,419A (Published Feb. 28, 1990).
Abstract of E.P.O. 356,419B1 (Published Dec. 16, 1992).
Abstract of German Dem. Rep. 226,573 (Published Aug. 28, 1985).
Abstract fo Japan 48–41,762 (Published 1973).
Abstract of U.S.S.R. 1,669,619 (Published Aug. 15, 1991).
Abstract #123:115806t in Wood Products vol. 123, p. 215 (1995).
Abstract #123:85765j in Textiles and Fibres vol. 123, p. 127 (1995).
Maron et al., Lenzinger Berichte vol.9 Sep. 1994, pp. 27–29.
Michels et al., Lenzinger Berichte No. 9 pp. 57.60 (Sep. 1994) (Lenzing, Austria).
English Abstract of Michels et al. Das Papier vol. 48, No. 3 (Mar. 1994) p. 107.
Michels et al., Das Papier vol. 48, No. 3 (Mar. 1994) pp. 107–111.
Taeger et al., Das Papier vol. 45, No. 12 (Dec. 1991) pp. 784–788.
Katrib et al., Holzforschung 42:21–27 (1988) (English language abstract).

*Primary Examiner*—Leo B. Tentoni
*Attorney, Agent, or Firm*—Baker & Botts LLP

[57] ABSTRACT

A process for the production of a cellulose moulded body, particularly cellulose fibers, wherein a cellulose-containing material is introduced into an aqueous solution of a tertiary amine-oxide to suspend said cellulose-containing material, water is withdrawn from the suspension while intensively mixing it and subjecting it to elevated temperature and reduced pressure until a solution of cellulose is produced, and the solution is moulded using a forming tool, particularly a spinneret, and passed into a precipitation bath to precipitate the cellulose dissolved, and is characterized in that a suspension containing a cellulose-containing material which has been exposed to an electron radiation is used to produce the cellulose solution. (Fig.)

8 Claims, 2 Drawing Sheets

PROCESS FOR THE PRODUCTION OF A CELLULOSE MOULDED BODY

The present invention is concerned with a process for the production of a cellulose moulded body, particularly cellulose fibers.

BACKGROUND OF THE INVENTION

As an alternative to the viscose process, in recent years there has been described a number of processes wherein cellulose, without forming a derivative, is dissolved in an organic solvent, a combination of an organic solvent and an inorganic salt, or in aqueous saline solutions. Cellulose fibers made from such solutions have received by BISFA (The International Bureau for the Standardisation of man made Fibers) the generic name Lyocell. As Lyocell, BISFA defines a cellulose fibre obtained by a spinning process from an organic solvent. By "organic solvent", BISFA understands a mixture of an organic chemical and water.

So far, however, only one process for the production of a cellulose fibre of the Lyocell type, i.e. the amine-oxide process, has achieved industrial-scale realization. In this process preferably N-methylmorpholine-N-oxide (NMMO) is used as a solvent. For the purposes of the present specification, the abbreviation "NMMO" is used in place of the term "tertiary amine-oxides", NMMO referring additionally to N-methylmorpholine-N-oxide, today preferably used.

Tertiary amine-oxides have been known for a long time as alternative solvents for cellulose. It is known for instance U.S. Pat. No. 2,179,181 that tertiary amine-oxides are capable of dissolving high-grade chemical pulp without derivatisation and that from these solutions cellulose moulded bodies, such as fibers, may be produced by precipitation. In U.S. Pat. Nos. 3,447,939, 3,447,956 and 3,508,941, further processes for the production of cellulose solutions, wherein cyclic amine-oxides are preferably used as solvents, are described. In all of these processes, cellulose is dissolved physically at elevated temperature.

When the solution is prepared using a double screw extruder or a stirring vessel, the pulp has to be subjected to preactivation to carry out the dissolution process at a sufficiently high rate (see "Das Papier", volume 12, pages 784–788). As pre-activation, production and regeneration of alkaline cellulose or a hydrothermal pulp treatment are proposed.

Also according to DD-A - 226 573, cellulose is preactivated before preparation of the solution, which is also carried out in an extruder. The DD-A cited starts from an NMMO-containing cellulose supension which is first homogenized in a stirring vessel. Afterwards, its consistency is increased to 12.5% by mass by centrifugating or squeezing and it is dried to a water content of 10–15% by mass (based on NMMO) and converted into a clear solution in an extruder exhibiting a degassing zone at temperatures of from 75° to 120° C.

In EP-A - 0 356 419 of the applicant, a process carried out using preferably a thin-film treatment apparatus is described, in which thin-film treatment apparatus a suspension of shredded pulp in an aqueous tertiary amine-oxide is spread as a thin layer and transported across a heating surface, said surface of this thin layer being exposed to reduced pressure. When transporting the suspension across the heating surface, water evaporates and the cellulose may be brought into solution, so that a spinnable cellulose solution may be delivered from the thin-film treatment apparatus.

All of the processes described above use high-grade chemical pulp produced e.g. from beech or pine wood as starting materials. In the state of the art, little is known about the use of other cellulose-containing materials.

Processing lignocellulose materials using the NMMO process is known from WO 86/05526. For processing, relatively aggressive conditions are suggested. Thus for instance poplar wood is first subjected to a specific hydrolysis process, and the solid product obtained is mixed at room temperature with NMMO having a water content of 13.5%. The NMMO used is the monohydrate of NMMO (melting point>70° C.), which at room temperature is present in a solid state. The solid mixture is homogenized, heated to 130° C. and molten, the hydrolyzed wood going into solution.

In "Holzforschung", 42, pages 21–27 (1988), it is also described that lignocellulose material may b e dissolved in a solution of NMMO in dimethylsulphoxide. The NMMO used is not an aqueous solution but has a water content of 15%, which also corresponds approximately to the monohydrate.

In the production of cellulose solutions, it is desirable to use less aggressive conditions or even avoid a melting process completely, since from literature it is known that cellulose as well as NMMO are subjected to a degradation process at elevated temperature and that the degradation products deteriorate the physical parameters of the Lyocell fibers such as strength and elongation. Moreover, it is desirable to increase the raw-material basis for the amine-oxide process to produce fibers from pulps which either have no good solubility in a tertiary amine-oxide or which may not be spun readily or not be spun a t all from a solution.

BRIEF SUMMARY OF THE INVENTION

Thus it is the object of the invention to improve the process for the production of cellulose moulded bodies, particularly fibers, according to the amine-oxide process in such a way that pulp materials having no good solubility in aqueous amine-oxide may be used at least partly as starting materials, or that pulp materials which are soluble in aqueous amine-oxide may be used, the solutions of which may not be spun at all or not be spun readily in the state of the art.

The process according to the invention for the production of a cellulose moulded body, particularly cellulose fibers, wherein a cellulose-containing material is introduced into an aqueous solution of a tertiary amine-oxide to suspend the cellulose-containing material, water is withdrawn from the suspension while intensively mixing it and subjecting it to elevated temperature and reduced pressure until a solution of cellulose is produced, and the solution is moulded using a forming tool, particularly a spinneret, and passed into a precipitation bath to precipitate the cellulose dissolved, is characterized in that a suspension containing a cellulose-containing material which has been exposed to an electron radiation, i.e. an electron beam, is used to produce the cellulose solution.

It has been shown that alternative pulp sources such as cotton cloth wastes from the garment industry and other cellulose wastes may be dissolved in the amine-oxide process and spun into fibers without chemical activation treatment when they are previously exposed to an electron radiation. Also pulps which may be dissolved, but the solution of which may only be spun at uneconomical concentration conditions or may not be spun readily, such as pulp of the Alistaple LD 9.2 type, may be spun into fibers after being irradiated. Duration and intensity of the electron radiation to be applied, i.e. the radiation dose, will depend on the type of the raw material used, but may be easily determined by pre-tests carried out by those skilled in the art.

The use of electron radiation to modify the polymerisation degree of cellulose carbamate is known. In this case however a cellulose derivative, i.e. cellulose carbamate, is irradiated.

In a preferred embodiment of the process according to the invention, an aqueous solution of the tertiary amine-oxide containing of from 60 to 80% by mass of amine-oxide is used to produce the suspension.

A further preferred embodiment of the process according to the invention is characterized in that as cellulose material, cellulose material which has not been irradiated is additionally used.

It has been shown that also mixtures of a cellulose material irradiated and a cellulose material not irradiated are of excellent use in the process. On the one hand, a suitable, rather low-molecular pulp, which may be readily dissolved and spun already in a state where it has not yet been irradiated, may be added to the cellulose material to further improve its processability. On the other hand, by irradiating pulp, such excellent properties may be given to the pulp irradiated that it may be mixed also with materials which are not so appropriate for the amine-oxide process, such as high-molecular pulp or the textiles mentioned, without suffering essential losses when processed.

It has been further shown that it is best to convert the suspension of irradiated pulp or irradiated cellulose-containing material into a spinnable solution by means of the thin-film technique. Therefore, a further preferred embodiment of the process according to the invention is characterized in that the solution is produced by continually feeding the suspension into an evacuatable, heatable vessel, spreading the fed suspension mechanically like a layer or a film so that two surfaces are formed, contacting one surface of the spread suspension to a heating surface to supply heat, transporting the spread suspension across the heating surface while intensively mixing it, subjecting, during transportation across the heating surface, the second surface opposite to this heating surface to reduced pressure to evaporate water, until the cellulose-containing material has gone into solution and continually withdrawing the solution from the vessel.

An appropriate arrangement wherein this embodiment of the process according to the invention may be carried out is a thin-film treatment apparatus such as manufactured by the company Buss (Switzerland) as a Filmtruder. It has been shown that such a thin-film treatment apparatus is particularly suitable for dissolving these pulps and these cellulose-containing materials. It is supposed that this is due to the high shearing forces present in the thin-film treatment apparatus.

BRIEF DESCRIPTION OF THE DRAWINGS

By means of the following Examples, the invention will be explained in more detail, documenting the influence of irradiation of pulps on the distribution of their molecular weight (Example 1), on their dissolution behaviour in an aqueous tertiary amine-oxide (Example 2) and on the spinnability of the cellulose solutions (Example 3).

EXAMPLE 1

First, the molecular weight profile (dN/N [%] against log MW of pseudopolystyrene) of the pulp Viscokraft LV (manufactured by International Paper), a pulp which due to its dissolution behaviour may be suitably used in the amine-oxide process, was established by means of gel permeation chromatography (GPC). The value dN/N (%) describes the frequency percentage of the fraction of mol mass.

Before carrying out GPC, an HPLC column was calibrated with polystyrene polymers, i.e. the masses detected are based on polystyrene polymers.

To perform GPC, pulp was dissolved in LiCl/DMAc and chromatographed with the HPLC column with defined void fractions. Detection was carried out using a refraction index detector.

Figure 1A:
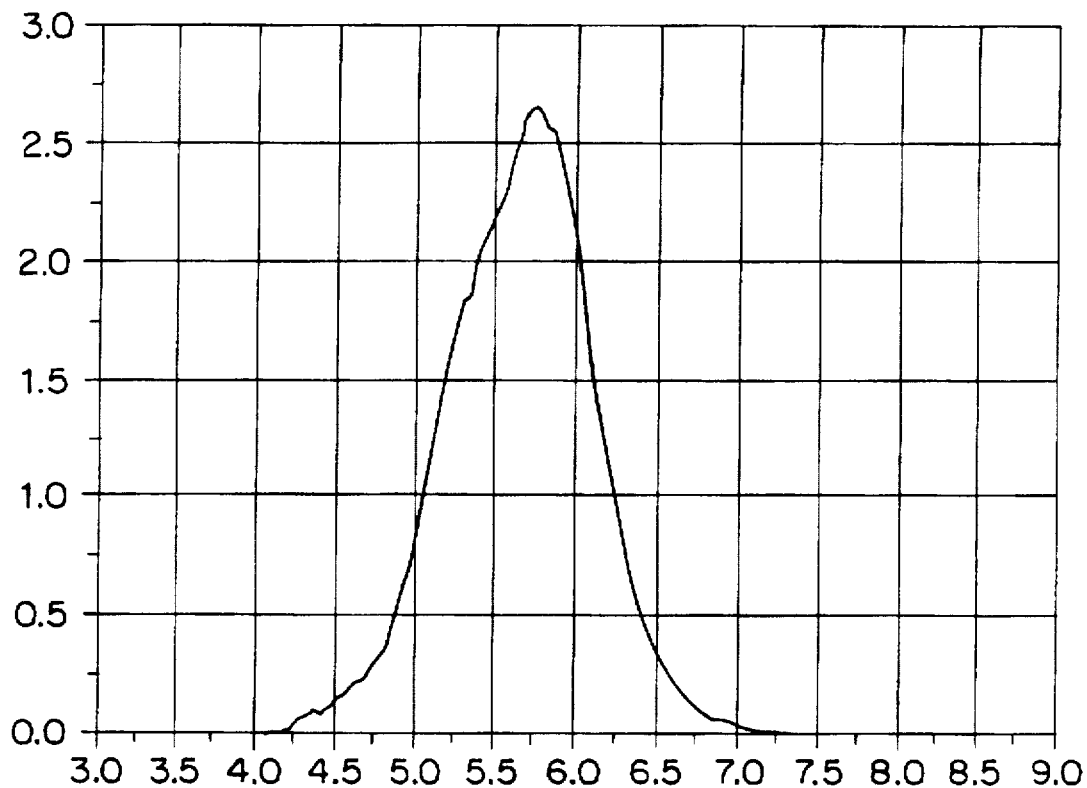

The result is shown in FIG. 1a (in all Figures: abscissa: log MW of pseudopolystyrene; ordinate: DN/N [%]), showing a relatively narrow distribution and a maximum of the logarithm of molecular weight (log MW of pseudopolystyrene) of about 5.75).

Figure 1B:
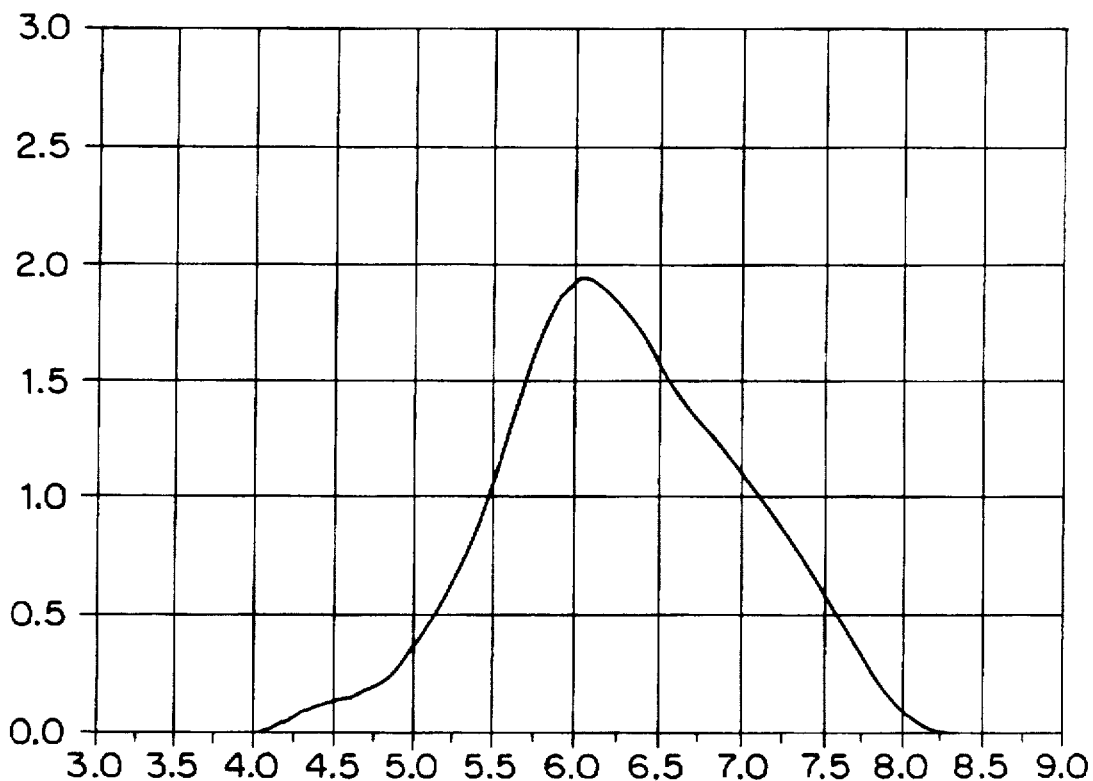

In comparison, the molecular weight profile of a further pulp, which actually is not suitable for use in the amine-oxide process (Alistaple LD 9.2, manufactured by Western Pulp), was established. The result is shown in FIG. 1b, showing that distribution is not only much broader than in the case of the pulp Viscokraft LV, but also that the maximum is higher, namely at a log MW of pseudopolystyrene of about 6.0.

Figure 1C:
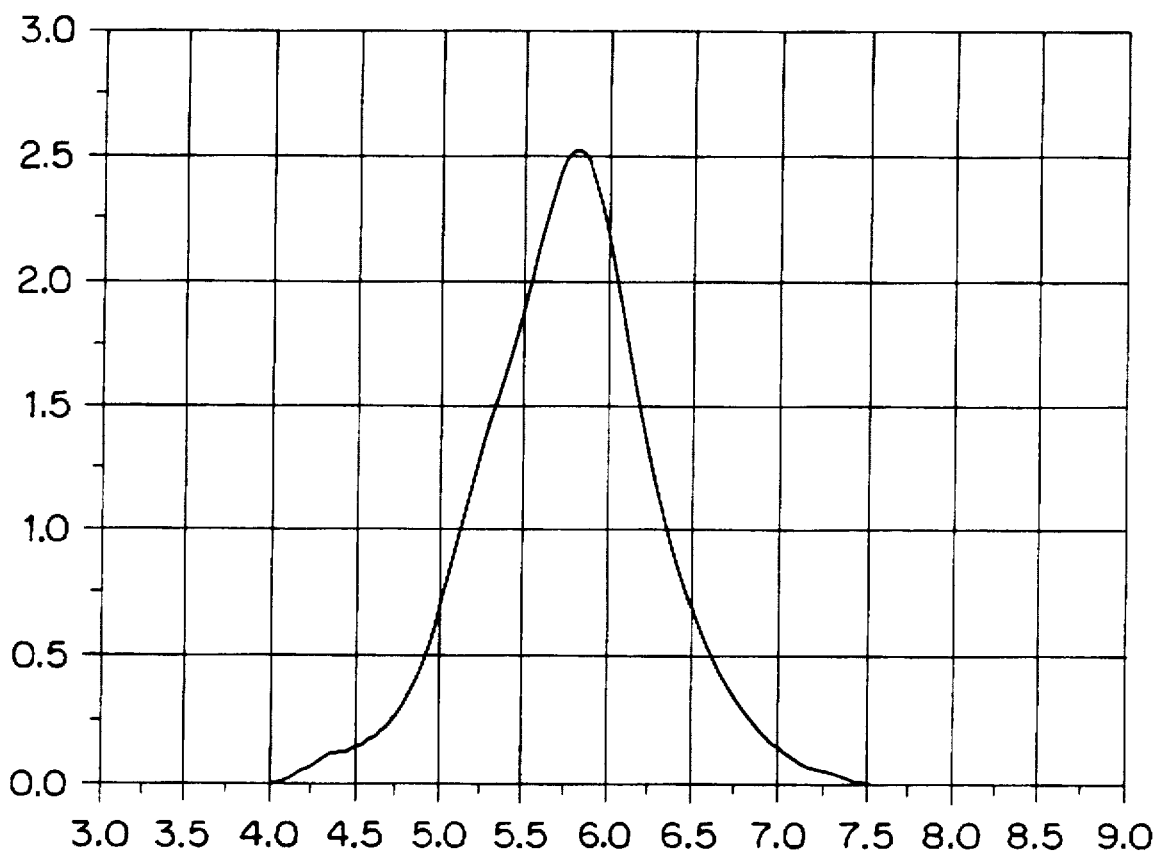

To show the positive influence of irradiation on the molecular weight profile, the same pulp Alistaple LD 9.2 was irradiated in a 500 kV electron acceleration apparatus applying a radiation dose of 20 kGy (inert gas: mixture of $CO_2$ and $N_2$; temperature: 25° C.), and the molecular weight profile of the irradiated pulp was established. The result is shown in FIG. 1c. The influence of irradiation is evident: the distribution graph is much more narrow and is very similar to that of the pulp Viscokraft LV. Also the maximum shifted towards a lower molecular weight and is now at about 5.75, i.e. also in the range of Viscokraft LV.

By means of these results it is shown that from a pulp which may not be suitably employed or not at all employed in the amine-oxide process, a pulp having a molecular weight distribution very similar to that of a pulp which is of good use in the amine-oxide process may be obtained by exposing it to an electron radiation.

EXAMPLE 2

To analyze the dissolution behaviour, first shredded pulp Viscokraft LV (average polymerisation degree: 450) was suspended in aqueous 50% NMMO, introduced into a kneading machine (IKA laboratory kneading machine HKD-T type manufactured by IKA Labortechnik) and left to impregnate for one hour. Afterwards, water was evaporated by heating the kneading machine using a heating medium exhibiting a temperature of 130° C. and by lowering the reduced pressure in defined intervals of time, until the pulp had completely gone into solution. When a reduced pressure of 125 mbar was reached, a sample was taken from the kneading machine in certain time intervals (3×5 minutes, 4 minutes, then 2 minutes each, until complete dissolution) and microscopically analyzed (magnification: 100×).

To evaluate the sample, the following dissolution marks were given:

Mark 5 many fibre portions are to be seen;
Mark 4: many undissolved particles and long crystallites are to be seen;
Mark 3: slightly shorter crystallites are to be seen;
Mark 2: few crystallites are to be seen;
Mark 1: actually no undissolved particles are to be seen.

The results are shown below in Table 1. From this Table it may be seen that Viscokraft LV starts dissolving after about 10 minutes, the dissolution process subsequently being rather continuous and finished after about 23 minutes. At this point, the temperature is 99.0° C.

For comparison, the above test was repeated using pulp Alistaple LD 9.2 (average polymerisation degree: 1978), the rest of the conditions remaining unchanged. The results are also indicated in Table 1 and show that this pulp dissolves only after 29 minutes and at a higher temperature (104.7° C.). This clearly shows that this pulp dissolves less readily.

To show the influence of irradiation, the test was repeated using irradiated Alistaple LD 9.2 (20 kGy) (average polymerisation degree after irradiation: 414). Also these results are indicated in Table 1. They show that the irradiated pulp resolves already after 19 minutes and at a temperature of only 95.4° C. From the development of the dissolution marks it may be seen that the irradiated pulp obviously dissolves rapidly after a preparation time of 15 minutes.

TABLE 1

| Pulp | Time (min) | Dissolution mark | Temperature (°C.) | Pressure (mbar) |
|---|---|---|---|---|
| Viscokraft | 0 | 5 | 88.2 | 125 |
| " | 5 | 5 | 89.8 | 100 |
| " | 10 | 5 | 91.3 | 75 |
| " | 15 | 1.5 | 93.8 | 50 |
| " | 19 | 1.5 | 96.1 | 50 |
| " | 21 | 1.2 | 97.6 | 50 |
| " | 23 | 1 | 99.0 | 50 |
| Alistaple (not irradiated) | 0 | 5 | 86.3 | 125 |
| " | 5 | 5 | 87.0 | 100 |
| " | 10 | 5 | 87.6 | 75 |
| " | 15 | 5 | 93.0 | 50 |
| " | 19 | 3.5 | 96.0 | 50 |
| " | 21 | 3 | 98.3 | 50 |
| " | 23 | 2.5 | 99.6 | 50 |
| " | 25 | 2 | 101.1 | 50 |
| " | 27 | 1.2 | 103.0 | 50 |
| " | 29 | 1 | 104.7 | 50 |
| Alistaple (irradiated) | 0 | 5 | 87.4 | 125 |
| " | 5 | 5 | 88.9 | 100 |
| " | 10 | 5 | 91.5 | 75 |
| " | 15 | 2 | 93.9 | 50 |
| " | 19 | 1 | 95.4 | 50 |

It also seems remarkable that irradiated pulp Alistaple LD 9.2 may be dissolved faster and under less aggressive conditions than Viscokraft LV, although both of the pulps actually have the same average polymerisation degree.

EXAMPLE 3

To analyze the influence of irradiating pulp on the spinning behaviour, first solutions having 15% of cellulose were produced from beech wood sulfite pulp bleached by means of ozone (BKZ03 manufactured by Lenzing AG).

As a spinning machine, a melt-flow index apparatus of the company Davenport, usually employed in plastics processing, was used. This apparatus consists of a heated cylinder, the temperature of which may be adjusted, into which the dope is introduced. By means of a piston which is loaded with a weight, the dope is extruded through the spinneret provided at the bottom of the cylinder. For the tests, the dope introduced into the spinning machine was extruded at various temperatures (of from 90° C. to 120° C.) through a spinneret having a diameter of 100 μm, passed through an air gap (3 cm) of dry air into an aqueous precipitation bath, deviated and withdrawn by means of a gallete provided subsequently to the precipitation bath. The dope output through the spinneret was 0.030 g/min.

Spinning behavior was analyzed by determining the maximum drawing rate (m/min). This maximum drawing rate is the rate at a given temperature whereat the drawn filament breaks, thus being a parameter for spinning behaviour. The higher this parameter is, the better the spinning behaviour will be. Afterwards, the test was repeated using the same pulp under identical conditions, except that the pulp used was once irradiated with 10 kGy and a further time with 20 kGy. The results are shown in Table 2a.

TABLE 2a

| Pulp BKZ03 | Temperature (°C.) | max. drawing rate (m/min). |
|---|---|---|
| (not irradiated) | 120 | 72 |
| " | 115 | 59 |
| " | 110 | 67 |
| " | 105 | 57 |
| " | 100 | 49 |
| " | 95 | 52 |
| (10 kGy) | 120 | 189 |
| " | 115 | 171 |
| " | 110 | 172 |
| " | 105 | 134 |
| " | 100 | 144 |
| " | 95 | 122 |
| " | 90 | 117 |
| (20 kGy) | 110 | 197 |
| " | 105 | 161 |
| " | 100 | 199 |
| " | 95 | 184 |
| " | 90 | 177 |

From Table 2a it can be seen that it is possible to improve spinnability of the pulp by irradiation.

For comparison, the above tests were repeated using pulp Alistaple LD 9.2, but it was shown that the filaments extruded from a 15% solution of not irradiated Alistaple LD 9.2 broke immediately, i.e., already at a very low drawing rate. Such solutions are referred to as not spinnable. The results using irradiated Alistaple LD 9.2 (10 kGy and 20 kGy) are indicated in the following Table 2b.

TABLE 2b

| Pulp Alistaple | Temperature (°C.) | max. drawing rate (m/min). |
|---|---|---|
| (10 kGy) | 120 | 155 |
| " | 115 | 169 |
| " | 110 | 175 |
| " | 105 | 182 |
| " | 100 | 172 |
| " | 95 | 144 |
| " | 90 | 150 |
| (20 kGy) | 120 | 199.7 |
| " | 115 | 195 |
| " | 110 | 187 |
| " | 105 | 193 |
| " | 100 | 185 |
| " | 95 | 178.3 |
| " | 90 | 184.3 |

It has been shown further that the textile data of fibers produced from irradiated pulps do not significantly differ from those known of fibers from not irradiated pulps, and that pulps such as Alistaple LD 9.2 producing solutions which are considered to be not spinnable are modified such that they may be used in the amine-oxide process by exposing them to an electron radiation.

We claim:

1. A process for the production of a cellulose moulded body comprising the steps of exposing a cellulose-containing material to electron radiation, introducing said irradiated cellulose-containing material into an aqueous solution of a tertiary amine-oxide to form a suspension, withdrawing water from said suspension while intensively mixing it and subjecting it to elevated temperature and reduced pressure to form a mouldable solution, moulding said mouldable solution, and passing said moulded solution into a precipitation bath to precipitate the dissolved cellulose to form said moulded body.

2. A process according to claim 1, wherein said aqueous solution used to produce said suspension contains of from 60 to 80% by mass of tertiary amine-oxide.

3. A process according to claim 1, wherein cellulose-containing material which has not been exposed to electron radiation is introduced into said aqueous solution in addition to irradiated cellulose material.

4. A process according to one of the claims 1, 2 or 3, wherein characterized in that as said tertiary amine-oxide N-methylmorpholine-N-oxide is used.

5. A process according to claim 1, wherein said mouldable solution is produced by continually feeding said suspension into an evacuatable, vessel, having an interior heatable wall providing a heated surface, spreading said fed suspension mechanically to form a layer having two surfaces, one of said surfaces of said spread suspension being in contact with said heating surface to supply heat to said spread suspension, transporting said spread suspension across said heating surface while intensively mixing it, subjecting, during transportation across said heating surface, the second surface of said spread suspension opposite to said heating surface to reduced pressure to evaporate water, until said cellulose-containing material has gone into solution and continually withdrawing said solution from said vessel.

6. The process according to claim 5 wherein said aqueous solution used to produce said suspension contains from 60 to 80% by mass of tertiary amine-oxide.

7. The process according to claim 5 wherein cellulose-containing material which has not been exposed to electron radiation is introduced into said aqueous solution in addition to irradiated cellulose-containing material.

8. The process according to any of claims 5, 6 or 7 wherein the tertiary amine-oxide is N-methylmorpholine-N-oxide.

* * * * *